2,725,299
Patented Nov. 29, 1955

2,725,299

METHOD FOR THE ARTIFICIAL AGEING OF GREEN COFFEES

Charles Platel, Calais, Léon Delahousse, Pont du Leu, near Calais, and Claire Laffitte, Bordeaux, France No Drawing. Application September 6, 1952, Serial No. 308,302

Claims priority, application France November 6, 1951

5 Claims. (Cl. 99—65)

It is known that roasted coffees which are obtained from most green coffees which have been stocked during a few months or even during a few years have a better taste and a better aroma than those which are obtained from green freshly harvested coffees.

The present invention has for its object to enable the roasting of coffees immediately after their harvest, if desired, by means of a treatment which provides them with all the qualities of the natural ageing and which even makes it possible to enhance the flavour or the aroma.

The method for the artificial ageing of unroasted coffee which forms the subject matter of the present invention essentially consists in subjecting green coffee to a controlled oxidation, preferably under the action of a product capable of delivering nascent or activated oxygen, optionally preceded by a treatment for the dehydration of the coffee.

In order to carry out the method in accordance with the invention, the green coffee is brought into relation with a product capable of delivering nascent oxygen and of being easily eliminated such as, for example, ozone or peroxide of hydrogen possibly containing a certain proportion of water. It is also possible to cause a plurality of products to intervene, which answer said characteristic feature.

The factors for controlling the intensity of the oxidation of green coffee are:

The time during which the green coffee is subjected to the action of the oxygen;

The oxidizing power and the nature of the oxidizing agent which supplies the oxygen;

The quantity of oxygen which is used for a given time and a given quantity of coffee.

It is possible, to eventually influence the action of these various factors either with a view to accelerate the ageing process or with a view to a deeper action, said actions being effected either separately or simultaneously through one or more preliminary and/or subsequent treatments to the oxidation.

No general law was found for the application of the method; moreover, it does not seem that such a law may be established owing to the differences which exist between one coffee and another, which motivates nuances in the treatments.

However, practical and simple tests which are within reach of the man skilled in the art make it possible to determine with a sufficient precision the duration of the treatment as well as the quantity of oxygen which an oxidizing agent must liberate per unit of time in order to give a predetermined result.

In this respect it is possible to advantageously effect a more or less elaborate treatment of dehydration of green coffee. Such a treatment may be conducted, for example, up to a beginning of decomposition through the heat and a removal of the water entering the constitution of the organic materials of the bean. According to the manner in which the dehydration is conducted, it is possible to obtain effects which are favourable for the quality of the roasted coffee. More particularly, it is possible to clear up the taste of certain lower kinds of coffee, by reducing the disagreeable quality in the taste of the uneliminated mouldy or damaged beans, or by neutralizing certain racy tastes.

The subsequent treatments are generally limited to a heating of the oxidized coffee in order to avoid a later development of the ageing. Said heating is effected, for example, as a partial or total roasting. Its chief object is to remove the traces of oxidizing agents and the oxygen which may remain in the beans.

Instead of heating the oxidized coffee, it is also possible to leave it at rest in the open during a few days in the course of which the ageing becomes stable. Practically, it is sufficient to leave it at rest during 5 or 6 days, since after this time, an appreciable variation of the flavour and of the properties of the coffee is no longer observed.

Thus, the ageing method in accordance with the invention consists, if all the above enumerated means are caused to act, in dehydrating the green coffee, in oxidizing it and then in heating it or in leaving it exposed to air during 5 or 6 days in order that the ageing which has thus been obtained be stable without modifying the constituent elements of the coffee.

The dehydration of green coffee is effected either through subjecting the coffee to the action of the vacuum or through moderately heating it, or still by other means. Both cited means may be used in combination. Through suitable measurings of said means, it is possible to obtain different final results, more particularly as regards the nuance of the taste of the infused coffee.

The oxidation is effected in such a manner that the desired stage of ageing is not exceeded and that the aromatic and physiological properties of the coffee are not injured. In case the oxidizing agent which is used is a gas such as ozone, for example, it may be of interest to take previously heated green coffee which is then treated with the cold gas. In this manner, the gas will enter the heart of the bean during its cooling. On the contrary, if a liquid oxidizing agent is used such as peroxide of hydrogen, for example, the coffee must be cold in order to avoid the sudden decomposition of the oxidizing agent. This latter may be used at different degrees of concentration according to the requirements, but peroxide of hydrogen is generally used at a concentration from about 1.5% to about 2% by volume. The proportion which is used may vary between 3 and 6% of the weight of the green coffee. It is also possible to add a wetting product such as glycerine, for example, to the peroxide of hydrogen in order to facilitate its absorption right to the heart of the coffee bean.

In either case, the oxidizing agent must surround each grain of coffee in order that the nascent or activated oxygen may act in a homogeneous manner and with the best efficiency on each grain of green coffee. It is to be noted that since the damaged beans are often spongy, they absorb the oxidizing agent very well, which then acts with the maximum of efficiency.

When the coffee has previously been dehydrated, the oxidation should be effected within six hours after complete drying. The greater the moisture content of the atmosphere, the more rapidly should the oxidation be carried out, since the success of the operation depends to a degree upon the absolute drying of the beans.

The flavour and the taste of the coffee treated according to the present invention depend, as already mentioned, upon the measuring of the acting oxygen and on the duration of the operation. The degree of dehydration determines the quality of the final flavour. The operation may thus be conducted in a very precise manner in every predetermined case and for the desired result.

As a reminder, some practical advantages may be emphasized which result from the application of the method and the best known of which are the reduction of the cost resulting from the place required for stocking as well as the possibility of revalorizing the sorted coffees and the lower kinds.

For effecting the oxidation, rotating hermetically closed churns, for example, are used. They are provided with a hollow shaft equipped with stuffing-boxes. Inside the churn, the shaft is provided with holes communicating with the central passage which makes it possible to obtain a regular distribution of an oxidizing fluid.

A form of execution of the artificial ageing method of coffee and of the method of correction of the taste in accordance with the invention applied to green coffee of any origin will now be described by way of example.

The green coffee is first dehydrated through heating, for example in the same devices as those which are normally used for roasting. To this end, the coffee is brought to a temperature varying from 100° C. to 150° C., through causing a dry and hot gas to flow over it. This temperature may be lower if the operation is conducted under a reduced pressure.

When the coffee has lost its moisture which corresponds to a decrease of weight of 5 to 10%, it is rapidly cooled through a current of air. The oxidation is then effected in rotary hermetically closed churns. During the rotation, peroxide of hydrogen at a concentration of about 1.7% by volume is introduced into the churn in a proportion of 6% of the weight of the coffee.

The peroxide of hydrogen is preferably introduced several times in the course of the oxidation so as to give the oxidizing agent time enough for penetrating the coffee beans. The intermixing of the coffee in the churn lasts till the oxidation has reached the desired degree; as a rule it lasts from one to two hours. At the end of this time all the peroxide of hydrogen has been absorbed by the coffee and it is then possible to empty the churn but the oxidation is nevertheless not interrupted.

At this stage, it is possible to choose between two manners of completing the treatment, which manners consist either in heating or roasting the coffee immediately or in leaving it at rest for 5 or 6 days during which the ageing proceeds and becomes stable by itself. In either case, the taste of the coffee which has thus been treated has become perfect and disagreeable flavours are no longer observed. The disadvantages of the coffee which has been roasted too prematurely have also disappeared.

What we claime is:

1. The method of ageing green coffee, which includes the steps of completely dehydrating the green coffee beans and heating them to a temperature between 100° C. and 150° C., cooling the dehydrated beans, and then mixing the beans with hydrogen peroxide in a hermetically closed chamber.

2. The method of claim 1 in which the hydrogen peroxide is added in the proportion of 6% by weight of the coffee bean treated, the hydrogen peroxide being at a concentration of about 1.7% by volume.

3. The method of claim 1 wherein the hydrogen peroxide is added to the coffee beans in a plurality of small increments.

4. The method of claim 1 in which the beans are then reheated to a roasting temperature and at least partially roasted, to stabilize the ageing effects.

5. The method of claim 1 in which the beans are then exposed to air for several days to stabilize the ageing effects.

References Cited in the file of this patent
UNITED STATES PATENTS

| | | |
|---|---|---|
| 250,100 | Philips | Nov. 29, 1881 |
| 660,602 | Timby | Oct. 30, 1900 |
| 1,519,373 | Hart | Dec. 16, 1924 |
| 2,027,801 | Wilder | Jan. 14, 1936 |
| 2,513,002 | Chenicek | June 27, 1950 |